United States Patent
Fujiwara et al.

(10) Patent No.: US 6,566,464 B2
(45) Date of Patent: May 20, 2003

(54) PROCESS FOR PRODUCING SOLID CATALYST COMPONENT AND CATALYST FOR α-OLEFIN POLYMERIZATION, AND PROCESS FOR PRODUCING α-OLEFIN POLYMER

(75) Inventors: Yasuki Fujiwara, Ichikawa (JP); Makoto Satoh, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 79 days.

(21) Appl. No.: 09/773,661

(22) Filed: Feb. 2, 2001

(65) Prior Publication Data

US 2001/0016633 A1 Aug. 23, 2001

(30) Foreign Application Priority Data

Feb. 8, 2000 (JP) ........................................ 2000-030289

(51) Int. Cl.[7] .................................................. C08F 4/58
(52) U.S. Cl. ................. 526/125.3; 526/348; 526/124.3; 526/123.1; 526/158; 526/142; 526/143; 526/119; 526/128; 502/110; 502/103; 502/126; 502/127; 502/115; 502/116
(58) Field of Search ............................. 526/348, 124.3, 526/125.3, 123.1, 158, 142, 143, 119, 128; 502/110, 103, 126, 127, 115, 116

(56) References Cited

U.S. PATENT DOCUMENTS

| 4,822,763 A | * | 4/1989 | Matsuura et al. ........... 502/113 |
| 4,952,649 A |  | 8/1990 | Kioka et al. |
| 5,354,820 A |  | 10/1994 | Funabashi |
| 5,539,067 A |  | 7/1996 | Parodi et al. |
| 5,576,400 A |  | 11/1996 | Suga et al. |
| 5,608,018 A | * | 3/1997 | Ebara et al. ................. 526/119 |
| 5,618,771 A |  | 4/1997 | Parodi et al. |

FOREIGN PATENT DOCUMENTS

| JP | 55145707 |  | 11/1980 |
| JP | 5763310 |  | 4/1982 |
| JP | 5883006 |  | 5/1983 |
| JP | 1149806 |  | 6/1983 |
| JP | 6178803 |  | 4/1986 |
| JP | 62297303 |  | 12/1987 |
| JP | 63132910 |  | 6/1988 |
| JP | 337211 |  | 2/1991 |
| JP | 5230136 |  | 9/1993 |
| JP | 7216017 |  | 8/1995 |
| JP | 10212312 |  | 8/1998 |
| JP | 10212319 |  | 8/1998 |
| JP | 10-212319 | * | 8/1998 |

* cited by examiner

Primary Examiner—Ling-Siu Choi
(74) Attorney, Agent, or Firm—Stevens, Davis, Miller & Mosher, L.L.P.

(57) ABSTRACT

There are disclosed a process for producing a solid catalyst component and a catalyst for α-olefin polymerization, and a process for producing an α-olefin polymer, wherein the process for producing a solid catalyst component comprises the steps of:

(1) reducing a specific titanium compound with an organomagnesium compound in the presence of an organosilicon compound having an Si—O bond (and an ester compound), thereby obtaining a solid product, and (2) contacting the solid product with at least one member selected from the group consisting of an electron donor compound (E1) and an organic acid halide, and a compound having a Ti-halogen bond, thereby obtaining the solid catalyst component.

16 Claims, No Drawings

PROCESS FOR PRODUCING SOLID CATALYST COMPONENT AND CATALYST FOR α-OLEFIN POLYMERIZATION, AND PROCESS FOR PRODUCING α-OLEFIN POLYMER

FIELD OF THE INVENTION

The present invention relates to a process for producing a solid catalyst component for α-olefin polymerization, a process for producing a catalyst for α-olefin polymerization, and a process for producing an α-olefin polymer.

BACKGROUND OF THE INVENTION

As a catalyst for a high stereospecificity polymerization of an α-olefin, the following catalysts are known.

(1) A catalyst obtained by combining a support type solid catalyst component prepared by supporting a tetravalent titanium halide on a magnesium halide with an organoaluminum compound as a co-catalyst and an organosilicon compound as a third component (refer to JP-A 57-63310, JP-A 58-83006 and JP-A 61-78803).

(2) A catalyst obtained by combining a trivalent titanium compound-containing solid catalyst component with an organoaluminum compound as a co-catalyst and an electron donor compound as a third component, wherein the trivalent titanium compound-containing solid catalyst component is prepared by reducing a titanium compound with an organomagnesium compound in the presence of both an organosilicon compound and an ester compound to obtain a solid product, and treating the solid product with an ester compound, followed by successive treatment with a mixture of an ether compound and titanium tetrachloride or a mixture of an ether compound, titanium tetrachloride and an ester compound (refer to JP-A 7-216017).

(3) A catalyst obtained by combining a trivalent titanium compound-containing solid catalyst component with an organoaluminum compound as a co-catalyst and an electron donor compound as a third component, wherein the trivalent titanium compound-containing solid catalyst component is prepared by reducing a titanium compound with an organomagnesium compound in the presence of both an organosilicon compound and an ester compound to obtain a solid product, and treating the solid product with a mixture of an ether compound and titanium tetrachloride, followed by successive treatment with an organic acid halide compound, and further followed by successive treatment with a mixture of an ether compound and titanium tetrachloride or a mixture of an ether compound, titanium tetrachloride and an ester compound (refer to JP-A 10-212319).

However, an α-olefin polymer obtained by polymerization using any of catalysts mentioned above does not have stereospecificity of a satisfactory level, from a viewpoint of the facts that (1) a molded article having a higher rigidity is desired particularly in the field of injection molding, and (2) rigidity of an injection-molded article is increased with increase in stereospecificity of a polymer to be used.

SUMMARY OF THE INVENTION

An object of the present invention is to provide a process for producing a catalyst for α-olefin polymerization, which catalyst has a high polymerization activity and a stereospecificity polymerization ability of a high level so that removal of an amorphous polymer is not needed.

Another object of the present invention is to provide a process for producing a solid catalyst component used for the production of such a catalyst.

A further object of the present invention is to provide a process for producing an α-olefin polymer by using such a catalyst.

The present invention provides a process for producing a solid catalyst component (1) for α-olefin polymerization, which comprises the steps of:

(1) reducing a titanium compound represented by the following formula [I] with an organomagnesium compound in the presence of an organosilicon compound having an Si—O bond, thereby obtaining a solid product, and (2) contacting the solid product with at least one member selected from the group consisting of an electron donor compound (E1) and an organic acid halide, and a compound having a Ti-halogen bond, thereby obtaining the solid catalyst component (1) for α-olefin polymerization,

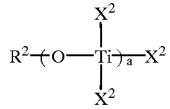

[I]

wherein "a" is a number of 2 to 20, $R^2$ is a hydrocarbon group having 1 to 20 carbon atoms, and $X^2$ is a halogen atom or a hydrocarbyloxy group having 1 to 20 carbon atoms, and all of $X^2$ may be the same or different from one another.

The present invention also provides a process for producing a solid catalyst component (2) for α-olefin polymerization, which comprises the steps of:

(1) reducing a titanium compound represented by the above formula [I] with an organomagnesium compound in the presence of an organosilicon compound having an Si—O bond and an ester compound, thereby obtaining a solid product, and (2) contacting the solid product with at least one member selected from the group consisting of an electron donor compound (E1) and an organic acid halide, and a compound having a Ti-halogen bond, thereby obtaining the solid catalyst component (2) for α-olefin polymerization.

The present invention further provides a process for producing a catalyst (1) for α-olefin polymerization, which comprises the steps of:

(1) reducing a titanium compound represented by the above formula [I] with an organomagnesium compound in the presence of an organosilicon compound having an Si—O bond, thereby obtaining a solid product, (2) contacting the solid product with at least one member selected from the group consisting of an electron donor compound (E1) and an organic acid halide, and a compound having a Ti-halogen bond, thereby obtaining a solid catalyst component (1) for α-olefin polymerization, and (3) contacting the solid catalyst component (1), an organoaluminum compound and an electron donor compound (E2) with one another, thereby obtaining the catalyst (1) for α-olefin polymerization.

The present invention still further provides a process for producing a catalyst (2) for α-olefin polymerization, which comprises the steps of:

(1) reducing a titanium compound represented by the above formula [I] with an organomagnesium compound in the presence of an organosilicon compound having an Si—O bond and an ester compound, thereby obtaining a solid product, (2) contacting the solid product with at least one member selected from the group consisting of an electron donor compound (E1) and an organic acid halide, and a compound having a Ti-halogen bond, thereby obtaining a solid catalyst component (2) for α-olefin polymerization, and (3) contacting the solid catalyst component (2), an organoaluminum compound and an electron donor compound (E2) with one another, thereby obtaining the catalyst (2) for α-olefin polymerization.

The present invention additionally provides a process for producing an α-olefin polymer, which comprises the steps of:

(1) reducing a titanium compound represented by the above formula [I] with an organomagnesium compound in the presence of an organosilicon compound having an Si—O bond compound, thereby obtaining a solid product, (2) contacting the solid product with at least one member selected from the group consisting of an electron donor compound (E1) and an organic acid halide, and a compound having a Ti-halogen bond, thereby obtaining a solid catalyst component (1) for α-olefin polymerization, (3) contacting the solid catalyst component (1), an organoaluminum compound and an electron donor compound (E2) with one another, thereby obtaining a catalyst (1) for α-olefin polymerization, and (4) subjecting an α-olefin to homopolymerization or copolymerization in the presence of the catalyst (1).

The present invention still additionally provides a process for producing an α-olefin polymer, which comprises the steps of:

(1) reducing a titanium compound represented by the above formula [I] with an organomagnesium compound in the presence of an organosilicon compound having an Si—O bond and an ester compound, thereby obtaining a solid product, (2) contacting the solid product with at least one member selected from the group consisting of an electron donor compound (E1) and an organic acid halide, and a compound having a Ti-halogen bond, thereby obtaining a solid catalyst component (2) for α-olefin polymerization, (3) contacting the solid catalyst component (2), an organoaluminum compound and an electron donor compound (E2) with one another, thereby obtaining a catalyst (2) for α-olefin polymerization, and (4) subjecting an α-olefin to homopolymerization or copolymerization in the presence of the catalyst (2).

In the present invention, the solid catalyst components (1) and (2) for α-olefin polymerization are hereinafter together referred to as "solid catalyst component" for brevity, and the catalysts (1) and (2) for α-olefin polymerization are also hereinafter together referred to as "catalyst" for brevity.

DETAILED DESCRIPTION OF THE INVENTION

Electron Donor Compound (E1)

Examples of the electron donor compound (E1) used for the production of the solid catalyst component in accordance with the present invention are oxygen-containing compounds such as ethers (containing diethers), ketones, aldehydes, carboxylic acids, organic acid esters, inorganic acid esters, organic acid amides, inorganic acid amides and acid anhydrides; and nitrogen-containing compounds such as ammonia, amines, nitriles and isocyanates. Of these, organic acid esters and ethers are preferred, carboxylic acid esters and diethers are more preferred, and carboxylic acid esters are most preferred.

As the carboxylic acid esters, for example, mono-carboxylic acid esters and poly-carboxylic acid esters are enumerated. More specifically, saturated aliphatic carboxylic acid esters, unsaturated aliphatic carboxylic acid esters, alicyclic carboxylic acid esters and aromatic carboxylic acid esters are enumerated.

Specific examples of the carboxylic acid esters are methyl acetate, ethyl acetate, phenyl acetate, methyl propionate, ethyl propionate, ethyl butyrate, ethyl valerate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, di-i-propyl phthalate, di-n-butyl phthalate, di-i-butyl phthalate, di-n-octyl phthalate and diphenyl phthalate.

Among these carboxylic acid esters, unsaturated aliphatic carboxylic acid esters such as methacrylic acid esters and maleic acid esters, and aromatic carboxylic acid esters such as benzoic acid esters and phthalic acid esters are preferred, and aromatic polycarboxylic acid esters are particularly preferred. Of these, dialkyl phthalates are most preferred.

Preferred diethers are those represented by the following formula,

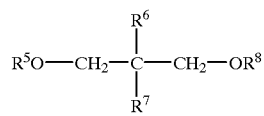

wherein $R^5$ to $R^8$ are independently of one another a straight- or branched-chain or alicyclic alkyl group having 1 to 20 carbon atoms; an aryl group; or an aralkyl group, provided that $R^6$ and $R^7$ may be independently of each other a hydrogen atom.

Specific examples of the diethers are 2,2-di-i-butyl-1,3-dimethoxypropane, 2-i-propyl-2-i-pentyl-1,3-dimethoxypropane, 2,2-bis(cyclohexylmethyl)-1,3-dimethoxypropane, 2-i-propyl-2-3,7-dimethyloctyl-1,3-dimethoxypropane, 2,2-di-i-propyl-1,3-dimethoxypropane, 2-i-propyl-2-cyclohexylmethyl-1,3-dimethoxypropane, 2,2-dicyclohexyl-1,3-dimethoxypropane, 2-i-propyl-2-i-butyl-1,3-dimethoxypropane, 2,2-di-i-propyl-1,3-dimethoxypropane, 2,2-di-propyl-1,3-dimethoxypropane, 2-i-propyl-2-cyclohexyl-1,3-dimethoxypropane, 2-i-propyl-2-cyclopentyl-1,3-dimethoxypropane, 2,2-di-cyclopentyl-1,3-dimethoxypropane and 2-heptyl-2-pentyl-1,3-dimethoxypropane.

Among diethers represented by the above formula, preferred diethers are those having the alkyl group as $R^5$ to $R^8$ which are independent of each other, and more preferred are those having the branched-chain or alicyclic alkyl group as $R^6$ and $R^7$ which are independent of each other, and the straight-chain alkyl group as $R^5$ and $R^8$ which are independent of each other.

Organic Acid Halide

A preferred organic acid halide used in the present invention is mono- or poly-carboxylic acid halides. As the organic acid halides, for example, aliphatic carboxylic acid halides, alicyclic carboxylic acid halides and aromatic carboxylic acid halides are enumerated. Specific examples of the organic acid halides are acetyl chloride, propionic chloride, butyric chloride, valeric chloride, acrylic chloride, methacrylic chloride, benzoic chloride, toluic chloride, anisic chloride, succinic chloride, malonic chloride, maleic chloride, itaconic chloride and phthalic chloride. Of these, aromatic carboxylic acid chlorides such as benzoic chloride, toluic chloride and phthalic chloride are preferred. Aromatic dicarboxylic acid dichlorides are more preferred, and phthalic chloride is particularly preferred.

Compound Having a Ti-Halogen Bond

A preferred compound having a Ti-halogen bond used in the present invention is a titanium compound represented by the following formula, $$Ti(OR^9)_b X^4_{4-b}$$

wherein $R^9$ is a hydrocarbon group having 1 to 20 carbon atoms, $X^4$ is a halogen atom, and b is a number satisfying $0 \leq b < 4$.

Examples of $R^9$ are alkyl groups such as methyl, ethyl, propyl, i-propyl, butyl, i-butyl, tert-butyl, amyl, i-amyl, tert-amyl, hexyl, heptyl, octyl, decyl and dodecyl groups; aryl groups such as phenyl, cresyl, xylyl and naphthyl groups; allyl group; and aralkyl groups such as a benzyl group. Among these $R^9$, alkyl groups having 2 to 18 carbon atoms and aryl groups having 6 to 18 carbon atoms are preferred, and straight-chain alkyl groups having 2 to 18 carbon atoms are particularly preferred. As the compound represented by the above formula, it is allowed to use those having two or more $OR^9$ groups different from one another.

As $X^4$ in the above formula, a chlorine atom, a bromine atom and an iodine atom are exemplified. Of these, a chlorine atom is particularly preferred.

A preferred b in the above formula is a number satisfying $0 \leq b \leq 2$, and a particularly preferred b is 0.

Specific examples of the titanium compound represented by the above formula are titanium tetrahalides such as titanium tetrachloride, titanium tetrabromide and titanium tetraiodide; hydrocarbyloxytitanium trihalides such as methoxytitanium trichloride, ethoxytitanium trichloride, butoxytitanium trichloride, phenoxytitanium trichloride, and ethoxytitanium tribromide; and dihydrocarbyloxytitanium dihalides such as dimethoxytitanium dichloride, diethoxytitanium dichloride, dibutoxytitanium dichloride, diphenoxytitanium dichloride, and diethoxytitanium dibromide. Among these titanium compounds, the most preferred is titanium tetrachloride.

Organosilicon Compound Having an Si—O Bond

Preferable examples of the organosilicon compound having an Si—O bond are, for example, those represented by any one of the following formulas, $$Si(OR^{10})_t R^{11}_{4-t},$$

$$R^{12}(R^{13}_2 SiO)_u SiR^{14}_3 \text{ and}$$

$$(R^{15}_2 SiO)_v$$

wherein $R^{10}$ is a hydrocarbon group having 1 to 20 carbon atoms, $R^{11}$, $R^{12}$, $R^{13}$, $R^{14}$ and $R^{15}$ are independently of one another a hydrocarbon group having 1 to 20 carbon atoms or a hydrogen atom, t is a number satisfying $0 < t \leq 4$, u is an integer of from 1 to 1000, and v is an integer of from 2 to 1000.

Specific examples of the organosilicon compound are tetramethoxysilane, dimethyldimethoxysilane, tetraethoxysilane, triethoxyethylsilane, diethoxydiethylsilane, ethoxytriethylsilane, tetra-i-propoxysilane, di-i-propoxy-di-i-propylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethyl polysiloxane, diphenyl polysiloxane, methylhydro polysiloxane and phenylhydro polysiloxane.

Among these, more preferable are alkoxysilane compounds represented by the formula $Si(OR^{10})_t R^{11}_{4-t}$, wherein t is preferably a number satisfying $1 \leq b \leq 4$. Of these, tetraalkoxysilane compounds of t=4 are particularly preferred, and the most preferred is tetraethoxysilane.

Titanium Compound

Examples of $R^2$ in the above formula [I] representing the titanium compound used in the present invention are alkyl groups such as methyl, ethyl, propyl, i-propyl, butyl, i-butyl, amyl, i-amyl, hexyl, heptyl, octyl, decyl and dodecyl groups; aryl groups such as phenyl, cresyl, xylyl and naphthyl groups: cycloalkyl groups such as cyclohexyl and cyclopentyl groups; allyl groups such as a propenyl group; and aralkyl groups such as a benzyl group. Among these, alkyl groups having 2 to 18 carbon atoms and aryl groups having 6 to 18 carbon atoms are preferred, and straight-chain alkyl groups having 2 to 18 carbon atoms are particularly preferred.

As the halogen atom represented by $X^2$ in the above formula [I], a chlorine atom, a bromine atom and an iodine atom are exemplified. Of these, a chlorine atom is particularly preferred. As the oxyhydrocarbon groups having 1 to 20 carbon atoms represented by $X^2$ in the above formula [I], an alkoxy group having a straight-chain alkyl group of 2 to 18 carbon atoms is particularly preferred. A preferred "a" in the above formula [I] is a number satisfying $2 \leq a \leq 5$, and a more preferred "a" is 2 or 4.

As specific examples of the titanium compound, tetra-i-propyl polytitanate (a mixture of compounds of "a"=2~10), tetra-n-butyl polytitanate (a mixture of compounds of "a"= 2~10), tetra-n-hexyl polytitanate (a mixture of compounds of "a"=2~10) and tetra-n-octyl polytitanate (a mixture of compounds of "a"=2~10) are exemplified. As such a compound, a condensate of a tetraalkoxytitanium obtained by reacting a tetralkoxytitanium with a small amount of water is further exemplified. Of these, tetra-n-butyl polytitanate is more preferred, and tetra-n-butyltitanium dimer or tetra-n-butyltitanium tetramer is particularly preferred.

It is permitted to use the titanium compound mentioned above in combination with a titanium compound represented by the following formula, $$Ti(OR^2)_q X^3_{4-q}$$

wherein $R^2$ is a hydrocarbon group having 1 to 20 carbon atoms, $X^3$ is a halogen atom, and q is a number satisfying $0 < q \leq 4$.

Organomagnesium Compound

The "organomagnesium compound" used in the present invention means any types of organomagnesium compounds having a magnesium-carbon bond. As the organomagnesium compound, a Grignard compound represented by the following first formula, and a dihydrocarbyl magnesium compound represented by the following second formula are particularly suitable.

$$R^{16}MgX^5$$

In this formula, Mg is a magnesium atom, $R^{16}$ is a hydrocarbon group having 1 to 20 carbon atoms and $X^5$ is a halogen atom.

$$R^{17}R^{18}Mg$$

In this formula, Mg is a magnesium atom, $R^{17}$ and $R^{18}$ are independently of each other a hydrocarbon group having 1 to 20 carbon atoms.

In the above second formula, $R^{17}$ and $R^{18}$ may be the same or different from each other. Specific examples of $R^{16}$ to $R^{18}$ are alkyl, aryl, aralkyl and alkenyl groups having 1 to 20 carbon atoms such as methyl, ethyl, propyl, i-propyl, butyl, sec-butyl, tert-butyl, i-amyl, hexyl, octyl, 2-ethylhexyl, phenyl and benzyl groups. It is particularly recommendable to use the Grignard compound represented by the above first formula in the form of an ether solution thereof from a viewpoint of polymerization activity of the catalyst obtained.

It is permitted to use the organomagnesium compound in combination with an organometallic compound to form a hydrocarbon soluble complex. Examples of the organometallic compounds are compounds of Li, Be, B, Al and Zn.

Ester Compound

In the present invention, it is recommendable to use an ester compound from a viewpoint of improving a polymerization activity and a stereospecificity polymerization ability of the catalyst obtained. The "ester compound" means a mono- or poly-carboxylic acid ester. As the ester compound, for example, saturated aliphatic carboxylic acid esters, unsaturated aliphatic carboxylic acid esters, alicyclic carboxylic acid esters and aromatic carboxylic acid esters are enumerated. Specific examples of the ester compounds are methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, di-i-propyl phthalate, di-n-butyl phthalate, di-i-butyl phthalate, di-n-octyl phthalate and diphenyl phthalate.

Among these ester compounds, unsaturated aliphatic carboxylic acid esters such as methacrylic acid esters and maleic acid esters and aromatic carboxylic acid esters such as phthalic acid esters are preferred. Dialkyl phthalates are particularly preferred.

Solid Product

The organosilicon compound, the titanium compound and the ester compound, which are used for the production of the solid product, are preferably dissolved in or diluted with a suitable solvent, and then used therefor. Examples of the solvent are aliphatic hydrocarbons such as hexane, heptane, octane and decane; aromatic hydrocarbons such as toluene and xylene; alicyclic hydrocarbons such as cyclohexane, methylcyclohexane and decalin; and ether compounds such as diethyl ether, dibutyl ether, di-i-amyl ether and tetrahydrofuran.

A temperature of the reduction reaction is usually from −50 to 70° C., preferably from −30 to 50° C., and particularly preferably from −25 to 35° C. A time required for the reduction reaction is not particularly limited, and it is usually from about 30 minutes to about 6 hours. After the reaction is carried out at the above-mentioned temperature, it is permitted to further carry out a post-reaction at a temperature of from 20 to 120° C.

The reduction reaction may be carried out in the presence of a porous carrier such as inorganic oxides and organic polymers, whereby the solid product produced can be supported on the porous carrier. The porous carrier may be conventional ones. Examples of the porous carrier are porous inorganic oxides such as $SiO_2$, $Al_2O_3$, MgO, $TiO_2$ and $ZrO_2$; and organic porous polymers such as polystyrene, styrene-divinylbenzene copolymer, styrene-ethylene glycolmethyl dimethacrylate copolymer, polymethylacrylate, polyethylacrylate, methyl acrylate-divinylbenzene copolymer, polymethylmethacrylate, methyl methacrylate-divinylbenzene copolymer, polyacrylonitrile, acrylonitrile-divinylbenzene copolymer, polyvinyl chloride, polyethylene and polypropylene. Of these, organic porous polymers are preferred, and styrene-divinylbenzene copolymer and acrylonitrile-divinylbenzene copolymer are particularly preferred.

With respect to the porous carriers, (i) a volume of micro pores having a radius of from 200 to 2000 Å is preferably 0.3 cc/g or more, and more preferably 0.4 cc/g or more, and (ii) a proportion of the volume of micro pores having a radius of from 200 to 2000 Å is preferably 35% or more, and more preferably 40% or more, provided that a volume of micro pores having a radius of from 35 to 75000 Å is assigned to be 100%. It is not recommendable to use a porous carrier having too small micro pore volume, because the catalyst component is not supported on the carrier effectively. Meanwhile, even if a porous carrier has a micro pore volume of 0.3 cc/g or more, the catalyst component is not supported on the carrier effectively when the porous carrier does not satisfy its micro pore radius of from 200 to 2000 Å.

The organosilicon compound is used in an amount of usually from 1 to 500, preferably from 1 to 300, and more preferably from 3 to 100 in terms of an atomic ratio Si/Ti, i.e. a ratio of a silicon atom in the organosilicon compound to a titanium atom in the titanium compound.

The organomagnesium compound is used in an amount of usually from 0.1 to 10, preferably from 0.2 to 5.0, and more preferably from 0.5 to 2.0 in terms of an atomic ratio (Ti+Si)/Mg, i.e. a ratio of the sum of a titanium atom in the titanium compound and a silicon atom in the organosilicon compound to a magnesium atom in the organomagnesium compound.

Alternatively, it is permitted that respective amounts of the titanium compound, the organosilicon compound and the organomagnesium compound are determined so as to make a molar ratio of Mg/Ti in the solid catalyst component from 1 to 51, preferably from 2 to 31, and more preferably from 4 to 26.

The ester compound is used in an amount of usually from 0.5 to 100, preferably from 1 to 60, and more preferably from 2 to 30 in terms of a molar ratio, ester compound/Ti, i.e. a ratio of the ester compound to a titanium atom in the titanium compound.

The solid product obtained by the reduction reaction is separated usually by solid-liquid separation, and washed several times with an inert hydrocarbon solvent such as hexane and heptane. The thus obtained solid product contains a trivalent titanium atom, a magnesium atom and a hydrocarbyloxy group, and in general has an amorphous structure or an extremely low crystallinity. A solid product having the amorphous structure is particularly preferred from a viewpoint of catalyst performance.

Solid Catalyst Component

In a process for obtaining the solid catalyst component by contacting the above-mentioned solid product with at least one member selected from the group consisting of the electron donor compound (E1) and the organic acid halide, and the compound having a Ti-halogen bond, all of respective contacts are usually carried out under atmosphere of an inert gas such as nitrogen and argon.

Said contact can be carried out, for example, by the following methods (1) to (4), wherein each contact may be repeated several times.

(1) The solid product is contacted with at least one member selected from the group consisting of the electron donor compound (E1) and the organic acid halide, followed by successive contact with the compound having a Ti-halogen bond.

(2) The solid product is contacted with a mixture of at least one member selected from the group consisting of the electron donor compound (E1) and the organic acid halide, and the compound having a Ti-halogen bond, followed by successive contact with the compound having a Ti-halogen bond.

(3) The solid product is contacted with the compound having a Ti-halogen bond, followed by successive contact with at least one member selected from the group consisting of the electron donor compound (E1) and the organic acid halide.

(4) The solid product is contacted with the compound having a Ti-halogen bond, followed by successive contact with at least one member selected from the group consisting of the electron donor compound (E1) and the organic acid halide, and further followed by successive contact with the compound having a Ti-halogen bond.

Preferred solid catalyst components are those obtained by the below mentioned processes (1) and (2). (1) A solid catalyst component obtained by a process wherein the solid product is contacted with the electron donor compound (E1), followed by successive contact with the compound having a Ti-halogen bond.

(2) A solid catalyst component obtained by a process here in the solid product is contacted with the compound having a Ti-halogen bond and the organic acid halide, followed by successive contact with the electron donor compound (E1) and the compound having a Ti-halogen bond.

More preferred solid catalyst components are those obtained by the below mentioned processes (1) to (6).

(1) A solid catalyst component obtained by a process wherein the solid product is contacted with the electron donor compound (E1), followed by successive contact with the compound having a Ti-halogen bond.

(2) A solid catalyst component obtained by a process wherein the solid product is contacted with the electron donor compound (E1), followed two times by successive contact with the compound having a Ti-halogen bond.

(3) A solid catalyst component obtained by a process wherein the solid product is contacted with the electron donor compound (E1), followed two times by successive contact with a mixture of the electron donor compound (E1) and the compound having a Ti-halogen bond.

(4) A solid catalyst component obtained by a process wherein the solid product is contacted with the compound having a Ti-halogen bond and the organic acid halide, followed by successive contact with the compound having a Ti-halogen bond.

(5) A solid catalyst component obtained by a process wherein the solid product is contacted with the compound having a Ti-halogen bond and the organic acid halide, followed three times by successive contact with the compound having a Ti-halogen bond.

(6) A solid catalyst component obtained by a process wherein the solid product is contacted with the electron donor compound (E1), the compound having a Ti-halogen bond and the organic acid halide, followed three times by successive contact with a mixture of the electron donor compound (E1) and the compound having a Ti-halogen bond.

Particularly preferred solid catalyst components are those obtained by the below mentioned processes (1) to (3).

(1) A solid catalyst component obtained by a process wherein the solid product is contacted with the electron donor compound (E1), followed two times by successive contact with a mixture of the electron donor compound (E1) and the compound having a Ti-halogen bond.

(2) A solid catalyst component obtained by a process wherein the solid product is contacted with a mixture of the electron donor compound (E1), the compound having a Ti-halogen bond and the organic acid halide, followed three times by successive contact with a mixture of the electron donor compound (E1) and the compound having a Ti-halogen bond.

(3) A solid catalyst component obtained by a process wherein the solid product is contacted with a mixture of the electron donor compound (E1) and the compound having a Ti-halogen bond, followed by successive contact with the organic acid halide, and further followed three times by successive contact with a mixture of the electron donor compound (E1) and the compound having a Ti-halogen bond.

The above-mentioned contact can be carried out by a conventional method such as a slurry method and a mechanical pulverization method using a ball mill. However, the latter is not recommendable from an industrial point of view, because a lot of fine powders may be produced to make a particle size distribution of the solid catalyst component obtained broad. Therefore, it is recommendable to carry out the contact in the presence of a diluent mentioned below.

Respective solids obtained by the above-mentioned contacts can be used as they are for the successive contact. However, it is recommendable to wash the solid with a diluent mentioned below, thereby removing unnecessaries contained in the solid.

The diluent is preferably a compound inert to the materials to be treated. Examples thereof are aliphatic hydrocarbons such as pentane, hexane, heptane and octane; aromatic hydrocarbons such as benzene, toluene and xylene; alicyclic hydrocarbons such as cyclohexane and cyclopentane; and halogenated hydrocarbons such as 1,2-dichloroethane and monochlorobenzene.

When the diluent is used during the above-mentioned contact, an amount of the diluent per contact is usually from 0.1 ml to 1000 ml, and preferably from 1 ml to 100 ml per g of the solid product. When the diluent is used for the washing as mentioned above, an amount thereof per washing is similar to that in the contact. The washing is carried out usually from 1 to 5 times per contact.

The contact and washing can be carried out usually at a temperature of from −50 to 150° C., preferably from 0 to 140° C., and more preferably from 60 to 135° C. A time for the contact is not particularly limited. It is preferably from 0.5 to 8 hours, and more preferably from 1 to 6 hours. Also, a time for the washing is not particularly limited. It is preferably from 1 to 120 minutes, and more preferably from 2 to 60 minutes.

The electron donor compound (E1) is used in an amount of usually from 0.1 to 50 mol, preferably from 0.3 to 30 mol, and more preferably from 0.5 to 20 mol per mol of the titanium atom in the solid product. When the amount is too large, destruction of the solid product may occur.

The organic acid halide is used in an amount of usually from 1 to 500 mol, preferably from 3 to 200 mol, and more preferably from 5 to 100 mol per mol of the titanium atom in the solid product, and usually from 0.01 to 1.0 mol, and preferably from 0.03 to 0.5 mol per mol of the magnesium atom in the solid product. When the amount is too large, destruction of the solid product may occur.

The compound having a Ti-halogen bond is used in an amount of usually from 10 to 10,000 mol, preferably from 30 to 5,000 mol, and more preferably from 100 to 3,000 mol per mol of the titanium atom in the solid product.

It is recommendable to use the compound having a Ti-halogen bond in combination with the electron donor compound (E1). In this case, the compound having a Ti-halogen bond is used in an amount of usually from 1 to 100 mol, preferably from 1.5 to 75 mol, and more preferably from 2 to 50 mol per mol of the electron donor compound.

When each compound mentioned above is subjected to several contacts, the above-mentioned amount is that per contact.

Usually, the solid catalyst component obtained according to the processes mentioned above are separated by solid-liquid separation, successively washed several times with an inert hydrocarbon solvent such as hexane and heptane, and then used for the polymerization. From a viewpoint of polymerization activity and stereospecificity polymerization ability of the catalyst, it is recommendable that the solid obtained by the solid-liquid separation is washed at a temperature of 50 to 120° C. at least one time with a large amount of a halogenized hydrocarbon solvent such as monochlorobenzene or an aromatic hydrocarbon solvent such as toluene, successively washed several times with an aliphatic hydrocarbon solvent such as hexane, and then used for the polymerization.

Organoaluminum Compound

The "organoaluminum compound" used in the present invention means a compound having at least one Al-carbon bond in the molecule. Typical examples thereof are those represented by the following formulas,

R$^{19}_w$AlY$_{3-w}$ and

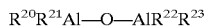R$^{20}$R$^{21}$Al—O—AlR$^{22}$R$^{23}$ wherein R$^{19}$ to R$^{23}$ are independently of one another a hydrocarbon group having 1 to 20 carbon atoms, Y is a halogen atom, a hydrogen atom or an alkoxy group, and w is a number satisfying 2≦w≦3.

Specific examples of said compound are trialkylaluminums such as triethylaluminum, tri-i-butylaluminum and trihexylaluminum; dialkylaluminum hydrides such as diethylaluminum hydride and di-i-butylaluminum hydride; dialkylaluminum halides such as diethylaluminum chloride; mixtures of trialkylaluminums and dialkylaluminum halides such as a mixture of triethylaluminum and diethylaluminum chloride; and alkylalumoxanes such as tetraethyldialumoxane and tetrabutyldialumoxane.

Among these, trialkylaluminums, mixtures of trialkylaluminums and dialkylaluminum halides and alkylalumoxanes are preferred. Triethylaluminum, tri-i-butylaluminum, a mixture of triethylaluminum and diethylaluminum chloride, and tetraethyldialumoxane are particularly preferred.

Electron Donor Compound (E2)

As the electron donor compound (E2) used in the present invention, for example, oxygen-containing electron donor compounds such as ethers including diethers, ketones, aldehydes, carboxylic acids, organic acid esters, inorganic acid esters, organic acid amides, inorganic acid amides and acid anhydrides; and nitrogen-containing electron donor compounds such as ammonia, amines, nitriles and isocyanates are enumerated. Of these, inorganic acid esters and diethers are preferred, and alkoxysilicon compunds represented by the following formula are more preferred,

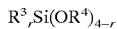R$^3_r$Si(OR$^4$)$_{4-r}$ wherein R$^3$ is a hydrocarbon group having 1 to 20 carbon atoms or a hydrogen atom, R$^4$ is a hydrocarbon atoms having 1 to 20 carbon atoms, and r is a number satisfying 0≦r<4. All of R3 and all of R$^4$ are the same or different from one another, respectively.

Particularly preferred electron donor compounds are alkoxysilicon compounds represented by the following formula,

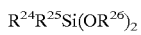R$^{24}$R$^{25}$Si(OR$^{26}$)$_2$ wherein R$^{24}$ is a C$_{3\sim20}$ hydrocarbon group, whose carbon atom adjacent to Si is secondary or tertiary, R$^{25}$ is a C$_{1\sim20}$ hydrocarbon group and R$^{26}$ is a C$_{1\sim20}$ hydrocarbon group.

As R$^{24}$, for example, branched chain alkyl groups such as isopropyl, sec-butyl, tert-butyl and tert-amyl groups; cycloalkyl groups such as cyclobutyl, cyclopentyl and cyclohexyl groups; cycloalkenyl groups such as a cyclopentenyl group; and aryl groups such as pheny and tolyl groups are enumerated. As R$^{25}$, for example, straight chain alkyl groups such as methyl, ethyl, propyl, butyl and pentyl groups, branched chain alkyl groups such as isopropyl, sec-butyl, tert-butyl and tert-amyl groups; cycloalkyl groups such as cyclopentyl and cyclohexyl groups; cycloalkenyl groups such as a cyclopentenyl group; and aryl groups such as pheny and tolyl groups are enumerated. As R$^{26}$, hydrocarbon groups having 1 to 5 carbon atoms are preferred.

Specific examples of the alkoxysilicon compounds used as the electron donor compound (E2) are di-i-propyldimethoxysilane, di-i-butyldimethoxysilane, di-tert-butyldimethoxysilane, tert-butylmethyldimethoxysilane, tert-butylethyldimethoxysilane, tert-butyl-n-ptropyldimethoxysilane, tert-butyl-n-butyldimethoxysilane, tert-amylmethyldimethoxysilane, tert-amylethyldimethoxysllane, tert-amyl-n-propyldimethoxysilane, tert-amyl-n-butyldimethoxysilane, i-butyl-i-propyl-dimethoxysilane, tert-butyl-i-propyldimethoxysilane, dicyclobutyldimethoxysilane, cyclobutyl-i-propyldimethoxysilane, cyclobutyl-i-butyldimethoxysilane, cyclobutyl-tert-butyldimethoxysilane, dicyclopentyldimethoxysilane, cyclopentyl-i-propyldimethoxysilane, cyclopentyl-i-butyldimethoxysilane, cyclopentyl-tert-butyldimethoxysilane, dicylohexyldimethoxysilane, cyclohexylmethyldmethoxysilane, cyclohexylethyldimriethoxysilane, cyclohexyl-i-propyldimethoxysilane, cyclohexyl-i-butyldimethoxysilane, cyclohexyl-tert-butyldimethoxysilane, cyclohexylcyclopentyldimethoxysilane, cyclohexylphenyldimethoxysilane, diphenyldimethoxysilane, phenymethyldimethoxysilane, phenyl-i-propyldimethoxysilane, phenyl-i-butyldimethoxysilane, phenyl-tert-butyldimethoxysilane, phenylcyclopentyldimethoxysilane, di-i- propyldiethoxysilane, di-i-butyldiethoxysilane, di-tert-butyldiethoxysilane, tert-butylmethyldiethoxysilane, tert-butylethyldiethoxysilane, tert-butyl-n-propyldiethoxysilane, tert-butyl-n-butyldiethoxysilane, tert-amylmethyldiethoxysilane, tert-amylethyldiethoxysilane, tert-amyl-n-propyldiethoxysilane, tert-amyl-n-butyldiethoxysilane, dicyclopentyldiethoxysilane, dicyclohexyldiethoxysilane, cycohexylmethyldiethoxysilane, cyclohexylethyldiethoxysilane, diphenyldiethoxysilane, phenylmethyldiethoxysilane and 2-norbornanemethyldiethoxysilane.

Polymerization of α-olefin

The "α-olefin" used in the present invention means that having not less than 3 carbon atoms. Examples of the α-olefin are straight chain monolefin such as propylene, butene-1, pentene-1, hexene-1, heptene-1, octene-1 and decene-1; branched chain monolefin such as 3-methylbutene-1,3-methylpentene-1 and 4-methylpenetene-1; and vinylcyclohexane. The α-olefin may be used each alone or in a mixture of two or more. Of these, it is preferred to use propylene or butene-1 each alone, or a mixed olefin containing propylene or butene-1 as a main component, and it is particularly preferred to use propylene alone or a mixed olefin containing propylene as a main component.

In the present invention, it is permitted to use an olefin mixture of at least two members selected from the group consisting of the α-olefins mentioned above and ethylene. Further, it is permitted to additionally use a compound having several unsaturated bonds such as a conjugated diene and a non-conjugated diene as a comonomer. With respect to a polymerization method, it is also possible to carry out a hetero-block copolymerization, in which the polymerization is carried out not only at one stage but also at two or more stages.

The catalyst in accordance with the present invention can be obtained by contacting the aforementioned solid catalyst component, organoaluminum compound and electron donor compound (E2) with one another. How to contact them is not limited as far as the desired catalyst is obtained. With respect to a method for contacting them, for example, the following methods (1) and (2) are enumerated. In carrying out the contact, the aforementioned respective components may be used as they are, or may be diluted with a solvent.

(1) A mixture of the aforementioned three components is prepared to contact them.

(2) The aforementioned three components are separately supplied to a polymerization zone to contact them in the zone.

In the method (2), it is permitted to first prepare a contact product by contacting any two components among three, and then supply the contact product and the remaining one component to a polymerization zone. With respect to a method for supplying respective components to a polymerization zone, it is recommendable to carry out the supply in an inert gas such as nitrogen and argon under water free conditions.

In the present invention, the α-olefin may be subjected to polymerization in the presence of the catalyst mentioned above, which polymerization is hereinafter referred to as "real polymerization", or subjected to pre-polymerization, followed by the real polymerization. Here, the "pre-polymerization" means polymerization of a small amount of the olefin in the presence of the aforementioned solid catalyst component and organoaluminum compound.

It is recommendable to carry out the pre-polymerization in a slurry state. As a solvent used for forming the slurry state, for example, inert hydrocarbons such as propane, butane, isobutane, pentane, isopentane, hexane, heptane, octane, cyclohexane, benzene and toluene are enumerated. It is allowed to use a liquid olefin in place of a part or whole of the solvent.

In the pre-polymerization, the organoaluminum compound is used in an amount of usually from 0.5 to 700 mol, preferably from 0.8 to 500 mol, and particularly preferably from 1 to 200 mol per mol of the titanium atom in the solid catalyst component.

An amount of the olefin to be pre-polymerized is usually from 0.01 to 1000 g, preferably from 0.05 to 500 g, and particularly preferably from 0.1 to 200 g per g of the solid catalyst component.

A concentration of the slurry in the pre-polymerization is preferably from 1 to 500 g-solid catalyst component/liter-solvent, and particularly preferably from 3 to 300 g-solid catalyst component/liter-solvent. A pre-polymerization temperature is preferably from −20 to 100° C., and particularly preferably from 0 to 80° C. A partial pressure of the olefin in the gas phase portion during the pre-polymerization is preferably from 0.01 to 20 kg/cm$^2$, and particularly preferably from 0.1 to 10 kg/cm$^2$, but the olefin which is liquid at that pressure and temperature for the pre-polymerization is not limited thereto. A time for the pre-polymerization is not particularly limited, and it is usually preferably from 2 minutes to 15 hours.

In the pre-polymerization, how to supply the solid catalyst component, the organoaluminum compound and the olefin is not limited. For example, the following methods (1) and (2) are enumerated. Here, it is permitted to use a chain transfer agent such as hydrogen in order to regulate a molecular weight of the polymer obtained.

(1) The solid catalyst component and the organoaluminum compound are contacted with each other, and thereafter the olefin is supplied.

(2) The solid catalyst component and the olefin are contacted with each other, and thereafter the organoaluminum compound is supplied.

Although how to supply the olefin is not limited, the following methods (1) and (2) are, for example, enumerated.

(1) The olefin is supplied one after another, while keeping an internal pressure of a polymerization zone to a predetermined level.

(2) The whole amount of the olefin predetermined is supplied at a time.

If desired, a part or the whole amount of the electron donor compound (E2) used for producing the catalyst as mentioned above may be present together in the pre-polymerization. The electron donor compound is used in an amount of usually from 0.01 to 400 mol, preferably from 0.02 to 200 mol, and particularly preferably from 0.03 to 100 mol per mol of the titanium atom in the solid catalyst component, and usually from 0.003 to 5 mol, preferably from 0.005 to 3 mol, and particularly preferably from 0.01 to 2 mol per mol of (ok?) the organoaluminum compound.

How to supply the electron donor compound in the pre-polymerization is not particularly limited. It is permitted to supply the electron donor compound independently from the organoaluminum compound, or contact both in advance and then supply the resulting product.

The olefin used in the pre-polymerization may be the same as or different from that used in the real polymerization.

In the real polymerization, the organoaluminum compound is used in an amount of usually from 1 to 1000 mol, and particularly preferably from 5 to 600 mol per mol of the titanium atom in the solid catalyst component.

In the real polymerization, the electron donor compound is used in an amount of usually from 0.1 to 2000 mol, preferably from 0.3 to 1000 mol. and particularly preferably from 0.5 to 800 mol per mol of the titanium atom in the solid catalyst component, and usually from 0.001 to 5 mol, preferably from 0.005 to 3 mol, and particularly preferably from 0.01 to 1 mole per mol of (ok?) the organoaluminum compound.

A temperature of the real polymerization is usually from −30 to 300° C., and preferably from 20 to 180° C. A polymerization pressure is not particularly limited, and from an industrial and economical point of view, it is usually from atmospheric pressure to 100 kg/cm$^2$, and preferably from about 2 to 50 kg/cm$^2$. The polymerization may be carried out in either a batch-wise manner or a continuous manner according to a slurry or solution polymerization method, wherein an inert hydrocarbon solvent such as propane, butane, isobutane, pentane, hexane, heptane and octane is used, or a bulk or gas phase polymerization method, wherein an olefin which is liquid at that polymerization temperature is used as a medium.

In the real polymerization, it is permitted to use a chain transfer agent such as hydrogen in order to regulate a molecular weight of the polymer obtained.

EXAMPLE

The present invention is explained in more detail with reference to the following Examples, which are only illustrative and not intended to limit the scope of the present invention.

Physical properties of the polymer and compositions of the solid product and the solid catalyst were measured in the following manners.

1. 20° C. Xylene-soluble Portion in Polymer (hereinafter noted as CXS (wt %))

CXS was measured according to the steps of:

(1) dissolving 1 g of the polymer in 200 ml of boiled xylene to obtain a solution, (2) cooling gradually the solution to 50° C., (3) immersing the cooled solution in ice water under stirring, whereby the solution is cooled to 20° C., (4) continuing the cooling at 20° C. for 3 hours to precipitate a polymer, (5) separating the precipitated polymer by filtration to obtain a filtrate, and (6) weighing a polymer in the filtrate, which polymer is a 20° C. Xylene-soluble portion, to obtain the weight (W g) thereof.

A value calculated by 100×W is assigned to be CXS (wt %). The smaller the CXS value, the higher the stereospecificity of the polymer.

2. Intrinsic Viscosity of Polymer (hereinafter noted as [η] (dl/g))

Measured in a teralin solvent at 135° C.

3. Bulk Density of Polymer (g/ml)

Measured according to JIS K-6721-1966.

4. Composition Analysis of Solid Product and Solid Catalyst Component (1) Content of Titanium Atom After decomposing a solid sample with diluted sulfuric acid, an excess amount of a hydrogen peroxide aqueous solution was added thereto. A characteristic absorption at 410 nm of the obtained liquid sample was measured with a double-beam spectrophotometer U-2001 manufactured by Hitachi Co., Ltd. and then the content was found using the calibration curve prepared in advance.

(2) Content of Alkoxy Group

After decomposing a solid sample with water, an alcohol content in the obtained liquid sample, which corresponded to the alkoxy group, was measured by an internal standard method of a gas chromatography, and then converted into the alkoxy group content.

(3) Content of Carboxylic Acid Ester

After decomposing a solid sample with water, the obtained liquid sample was extracted with a saturated hydrocarbon such as n-heptane to obtain an extract containing materials soluble therein, and the carboxilic acid ester content in the extract was measured by an internal standard method of a gas chromatography.

Example 1

(1) Production of Solid Product

A 500 ml flask equipped with a stirrer and a dropping funnel was purged with nitrogen, and thereafter 270 ml of hexane, 5.8 ml (21.9 mmol in terms of Ti atom) of tetrabutoxytitanium dimer, 2.5 ml (9.3 mmol) of di-i-butyl phthalate and 74 ml (329 mmol) of tetraethoxysilane were fed into the flask to obtain a uniform solution.

Successively, 172 ml of a di-n-butyl ether solution of n-butylmagnesium chloride (manufactured by Yuki Gosei Kogyo Co., Ltd., n-butylmagnesium chloride concentration: 2.1 mmole/ml) was gradually added dropwise from the dropping funnel thereto over 3 hours while maintaining a temperature in the flask at 5° C. After completion of the addition, the mixture was stirred at 5° C. for 30 minutes, and additionally stirred for 1.5 hours at 35° C. Thereafter, the reaction mixture was cooled to room temperature, and subjected to solid-liquid separation. The solid product separated was washed 3 times with each 200 ml of toluene, and then mixed with 200 ml of toluene to obtain a slurry of the solid product having a slurry concentration of 0.149 g/ml.

After sampling a part of the slurry, a composition analysis was conducted, and as a result, the solid product was found to contain 1.64 wt % of the titanium atom, 0.07 wt % of the phthalic acid ester, 38.5 wt % of the ethoxy group and 3.63 wt % of the butoxy group.

(2) Production of Solid Catalyst Component

A 100 ml flask equipped with a stirrer, a dropping funnel and a thermometer was purged with nitrogen. Thereafter, 54 ml of the solid product slurry obtained in the above (1) was fed into the flask, and 7.1 ml of a supernatant liquid was taken out. The residue was stirred for 1 hour at 105° C., and cooled to 95° C. Then, 6.9 ml (25.8 mmol) of di-i-butyl phthalate was added thereto, and contact was effected at 95° C. for 30 minutes. Thereafter, the resulting solid was separated from the liquid at that temperature and washed two times with each 40 ml of toluene at room temperature.

After completion of washing, 10 ml of toluene was added thereto. Further, a mixture of 0.8 ml (4.73 mmol) of butyl ether, 0.45 ml (1.68 mmol) of di-i-butyl phthalate and 16 ml (0.146 mol) of titanium tetrachloride was added thereto, and contact was effected at 105° C. for 3 hours. Thereafter, the resulting solid was separated from the liquid at that temperature and washed two times with each 40 ml of toluene at that temperature.

Successively, 10 ml of toluene and a mixture of 0.8 ml (4.73 mmol) of butyl ether and 8 ml (0.0728 mol) of titanium tetrachloride were added to the solid obtained above, and contact was effected at 105° C. for 1 hour. Then, the resulting solid was separated from the liquid at that temperature, washed three times with each 40 ml of toluene at that temperature, additionally washed three times with each 40 ml of hexane at room temperature, and then dried under reduced pressure to obtain 6.47 g of a solid catalyst component.

The solid catalyst component obtained was found to contain 1.70 wt % of the titanium atom, 9.79 wt % of the phthalic acid ester, 0.08 wt % of the ethoxy group and 0.11 wt % of the butoxy group.

(3) Polymerization of Propylene

A 3 liter stirring type stainless steel made autoclave was purged with argon, and 2.6 mmol of triethylaluminum, 0.26 mmol of cyclohexylethyldimethoxysilane and 8.5 mg of the solid catalyst component obtained in the above (2) were fed in the autoclave, and then hydrogen in an amount corresponding to a partial pressure of 0.33 kg/cm$^2$ Was introduced therein. Successively, 780 g of liquefied propylene was fed therein and a temperature of the autoclave was raised to 80° C. Polymerization was carried out at 80° C. for 1 hour. After the polymerization was over, the unreacted monomer was removed. The resulting polymer was dried under reduced pressure at 60° C. for 2 hours to obtain 328 g of a polypropylene powder. A yield of polypropylene per g of the solid catalyst component (hereinafter abbreviated as PP/cat) was found to be 38,590 (g/g), and a 20° C. xylene soluble portion (CXS) in the polymer, an intrinsic viscosity [η] of the polymer and a bulk density thereof were found to be 0.64 wt %, 2.18 dl/g and 0.371 g/ml, respectively. The results are as shown in Table 1.

Example 2

(1) Production of Solid Product

Example 1 (1) was repeated to obtain a solid product, except that the tetrabutoxytitanium dimer was changed to 4.9 ml (22.1 mmol in terms of titanium atom) of tetrabutoxytitanium tetramer.

The solid product was found to contain 1.40 wt % of the titanium atom, 0.10 wt % of the phthalic acid ester, 38.5 wt % of the ethoxy group and 3.42 wt % of the butoxy group. The slurry concentration was 0.149 g/ml.

(2) Production of Solid Catalyst Component

Example 1 (2) was repeated to obtain a solid catalyst component, except that the solid product slurry obtained in the above (1) was used as the solid product slurry.

The solid catalyst component was found to contain 1.61 wt % of the titanium atom, 11.1 wt % of the phthalic acid ester, 0.53 wt % of the ethoxy group and 0.08 wt % of the butoxy group.

(3) Polymerization of Propylene

Example 1 (3) was repeated to polymerize propylene, except that the solid catalyst component obtained in the above (2) was used as the solid catalyst component. The results are as shown in Table 1.

Comparative Example 1

(1) Production of Solid Product

Example 1 (1) was repeated to obtain a solid product, except that the tetrabutoxytitanium dimer was changed to 7.5 ml (22.0 mmol in terms of titanium atom) of tetrabutoxytitanium.

The solid product was found to contain 2.11 wt % of the titanium atom, 0.24 wt % of the phthalic acid ester, 39.3 wt % of the ethoxy group and 3.15 wt % of the butoxy group. The slurry concentration was 0.143 g/ml.

(2) Production of Solid Catalyst Component

Example 1 (2) was repeated to obtain a solid catalyst component, except that the solid product slurry obtained in the above (1) was used as the solid product slurry.

The solid catalyst component was found to contain 2.04 wt % of the titanium atom, 13.8 wt % of the phthalic acid ester, 0.47 wt % of the ethoxy group and 0.08 wt % of the butoxy group. (3) Polymerization of propylene Example 1 (3) was repeated to polymerize propylene, except that the solid catalyst component obtained in the above (2) was used as the solid catalyst component. The results are as shown in Table 1.

Example 3

(1) Production of Solid Product

Example 1 (1) was repeated to obtain a solid product, except that the amount of di-i-butyl phthalate was changed to 5.0 ml (18.7 mmol).

The solid product was found to contain 1.61 wt % of the titanium atom, 0.26 wt % of the phthalic acid ester, 34.9 wt % of the ethoxy group and 3.24 wt % of the butoxy group. The slurry concentration was 0.150 g/ml.

(2) Production of Solid Catalyst Component

Example 1 (2) was repeated to obtain a solid catalyst component, except that the solid product slurry obtained in the above (1) was used as the solid product slurry.

The solid catalyst component was found to contain 1.61 wt % of the titanium atom, 12.0 wt % of the phthalic acid ester, 0.42 wt % of the ethoxy group and 0.12 wt % of the butoxy group.

(3) Polymerization of Propylene

Example 1 (3) was repeated to polymerize propylene, except that the solid catalyst component obtained in the above (2) was used as the solid catalyst component. The results are as shown in Table 1.

Example 4

(1) Production of Solid Product

Example 3 (1) was repeated to obtain a solid product, except that the tetrabutoxytitanium dimer was changed to 4.9 ml (22.1 mmol in terms of titanium atom) of tetrabutoxytitanium tetramer.

The solid product was found to contain 1.39 wt % of the titanium atom, 33.7 wt % of the ethoxy group, 3.08 wt % of the butoxy group and no phthalic acid ester. The slurry concentration was 0.134 g/ml.

(2) Production of Solid Catalyst Component

Example 1 (2) was repeated to obtain a solid catalyst component, except that the solid product slurry obtained in the above (1) was used as the solid product slurry.

The solid catalyst component was found to contain 1.62 wt % of the titanium atom, 10.5 wt % of the phthalic acid ester, 0.46 wt % of the ethoxy group and 0.06 wt % of the butoxy group.

(3) Polymerization of Propylene

Example 1 (3) was repeated to polymerize propylene, except that the solid catalyst component obtained in the above (2) was used as the solid catalyst component. The results are as shown in Table 1.

Comparative Example 2

(1) Production of Solid Product

Example 3 (1) was repeated to obtain a solid product, except that the tetrabutoxytitanium dimer was changed to 7.5 ml (22.0 mmol in terms of titanium atom) of tetrabutoxytitanium.

The solid product was found to contain 1.78 wt % of the titanium atom, 0.26 wt % of the phthalic acid ester, 36.1 wt % of the ethoxy group and 2.94 wt % of the butoxy group. The slurry concentration was 0.148 g/ml.

(2) Production of Solid Catalyst Component

Example 1 (2) was repeated to obtain a solid catalyst component, except that the solid product slurry obtained in the above (1) was used as the solid product slurry.

The solid catalyst component was found to contain 1.96 wt % of the titanium atom, 14.6 wt % of the phthalic acid ester, 0.38 wt % of the ethoxy group and 0.06 wt % of the butoxy group.

(3) Polymerization of Propylene

Example 1 (3) was repeated to polymerize propylene, except that the solid catalyst component obtained in the above (2) was used as the solid catalyst component. The results are as shown in Table 1.

Example 5
(1) Production of Solid Product

Example 1 (1) was repeated to obtain a solid product, except that the amount of di-i-butyl phthalate was changed to 7.5 ml (28.0 mmol).

The solid product was found to contain 1.43 wt % of the titanium atom, 0.2 wt % of the phthalic acid ester, 32.7 wt % of the ethoxy group and 2.98 wt % of the butoxy group. The slurry concentration was 0.142 g/ml.

(2) Production of Solid Catalyst Component

Example 1 (2) was repeated to obtain a solid catalyst component, except that the solid product slurry obtained in the above (1) was used as the solid product slurry.

The solid catalyst component was found to contain 1.77 wt % of the titanium atom, 9.56 wt % of the phthalic acid ester, 0.45 wt of the ethoxy group and 0.09 wt % of the butoxy group.

(3) Polymerization of Propylene

Example 1 (3) was repeated to polymerize propylene, except that the solid catalyst component obtained in the above (2) was used as the solid catalyst component. The results are as shown in Table 1.

Example 6
(1) Production of Solid Product

Example 5 (1) was repeated to obtain a solid product, except that the tetrabutoxytitanium dimer was changed to 4.9 ml (22.1 mmol in terms of titanium atom) of tetrabutoxytitanium tetramer.

The solid product was found to contain 1.39 wt % of the E4 titanium atom, 0.08 wt % of the phthalic acid ester, 32.0 wt % of the ethoxy group and 2.88 wt % of the butoxy group. The slurry concentration was 0.140 g/ml.

(2) Production of Solid Catalyst Component

Example 1 (2) was repeated to obtain a solid catalyst component, except that the solid product slurry obtained in the above (1) was used as the solid product slurry.

The solid catalyst component was found to contain 1.72 wt % of the titanium atom, 10.1 wt % of the phthalic acid ester, 0.43 wt % of the ethoxy group and 0.10 wt % of the butoxy group.

(3) Polymerization of Propylene

Example 1 (3) was repeated to polymerize propylene, except that the solid catalyst component obtained in the above (2) was used as the solid catalyst component. The results are as shown in Table 1.

Comparative Example 3
(1) Production of Solid Product

Example 5 (1) was repeated to obtain a solid product, except that the tetrabutoxytitanium dimer was changed to 7.5 ml (22.0 mmol in terms of titanium atom) of tetrabutoxytitanium.

The solid product was found to contain 1.62 wt % of the titanium atom, 0.42 wt % of the phthalic acid ester, 34.8 wt % of the ethoxy group and 2.93 wt % of the butoxy group. The slurry concentration was 0.145 g/ml.

(2) Production of Solid Catalyst Component

Example 1 (2) was repeated to obtain a solid catalyst component, except that the solid product slurry obtained in the above (1) was used as the solid product slurry.

The solid catalyst component was found to contain 1.64 wt % of the titanium atom, 12.2 wt % of the phthalic acid ester, 0.38 wt % of the ethoxy group and 0.08 wt % of the butoxy group.

(3) Polymerization of Propylene

Example 1 (3) was repeated to polymerize propylene, except that the solid catalyst component obtained in the above (2) was used as the solid catalyst component. The results are as shown in Table 1.

Example 7
(1) Production of Solid Catalyst Component

A 100 ml flask equipped with a stirrer, a dropping funnel and a thermometer was purged with nitrogen. Thereafter, 48.8 ml of the solid product slurry obtained in a manner similar to that of Example 1 (1) was fed in the flask, and 22.3 ml of a supernatant liquid was taken out. A mixture of 0.8 ml (4.73 mmol) of butyl ether and 16 ml (0.146 mol) of titanium tetrachloride, and successively 1.6 ml (11.1 mmol: 0.20 ml/g-solid product)) of phthalic chloride were added to the residue, respectively. The resulting mixture was heated to 115° C., and stirred for 3 hours at that temperature. Thereafter, the resulting solid was separated from the liquid at that temperature and washed two times with each 40 ml of toluene at that temperature.

After completion of washing, a mixture of 10 ml of toluene, 0.45 ml (1.68 mmol) of di-i-butylphthalate, 0.8 ml (4.73 mmol) of butyl ether and 8 ml (0.073 mol) of titanium tetrachloride was added thereto, and contact was effected at 115° C. for 1 hour. Thereafter, the resulting solid was separated from the liquid at that temperature and washed two times with each 40 ml of toluene at that temperature.

Successively, 10 ml of toluene and a mixture of 0.8 ml (4.73 mmol) of butyl ether and 8 ml (0.073 mol) of titanium tetrachloride were added to the solid obtained above, and contact was effected at 115% for 1 hour. Then, the resulting solid was separated from the liquid at that temperature, and washed three times with each 40 ml of toluene at that temperature, additionally washed three times with each 40 ml of hexane at room temperature, and then dried under reduced pressure to obtain 6.12 g of a solid catalyst component.

The solid catalyst component was found to contain 1.93 wt % of the titanium atom, 9.12 wt % of the phthalic acid ester, 0.04 wt % of the ethoxy group and 0.19 wt % of the butoxy group.

(2) Polymerization of Propylene

Example 1 (3) was repeated to polymerize propylene, except that the solid catalyst component obtained in the above (1) was used as the solid catalyst component. The results are as shown in Table 1.

Comparative Example 4
(1) Production of Solid Catalyst Component

Example 7 (2) was repeated to obtain a solid catalyst component, except that the solid product slurry obtained in the same manner as in Comparative Example 1 (1) was used as the solid product slurry.

The solid catalyst component was found to contain 2.00 wt % of the titanium atom, 9.26 wt % of the phthalic acid ester, 0.04 wt % of the ethoxy group and 0.16 wt % of the butoxy group.

(2) Polymerization of Propylene

Example 1 (3) was repeated to polymerize propylene, except that the solid catalyst component obtained in the above (1) was used as the solid catalyst component. The results are as shown in Table 1.

Example 8
(1) Production of Solid Catalyst Component

Example 7 (2) was repeated to obtain a solid catalyst component, except that the solid product slurry obtained in the same manner as in Example 3 (1) was used as the solid product slurry.

The solid catalyst component was found to contain 1.97 wt % of the titanium atom, 9.00 wt % of the phthalic acid ester, 0.04 wt % of the ethoxy group and 0.20 wt % of the butoxy group.

(2) Polymerization of Propylene

Example 1 (3) was repeated to polymerize propylene, except that the solid catalyst component obtained in the above (1) was used as the solid catalyst component. The results are as shown in Table 1.

Comparative Example 5

(1) Production of Solid Catalyst Component

Example 7 (2) was repeated to obtain a solid catalyst component, except that the solid product slurry obtained in the same manner as in Comparative Example 2 (1) was used as the solid product slurry.

The solid catalyst component was found to contain 1.85 wt % of the titanium atom, 6.71 wt % of the phthalic acid ester, 0.03 wt % of the ethoxy group and 0.21 wt % of the butoxy group.

(2) Polymerization of Propylene

Example 1 (3) was repeated to polymerize propylene, except that the solid catalyst component obtained in the above (1) was used as the solid catalyst component. The results are as shown in Table 1.

Example 9

(1) Production of Solid Catalyst Component

Example 7 (2) was repeated to obtain a solid catalyst component, except that the solid product slurry obtained in the same manner as in Example 5 (1) was used as the solid product slurry.

The solid catalyst component was found to contain 1.84 wt % of the titanium atom, 7.71 wt % of the phthalic acid ester, 0.03 wt % of the ethoxy group and 0.18 wt % of the butoxy group.

(2) Polymerization of Propylene

Example 1 (3) was repeated to polymerize propylene, except that the solid catalyst component obtained in the above (1) was used as the solid catalyst component. The results are as shown in Table 1.

Example 10

(1) Production of Solid Catalyst Component

Example 7 (2) was repeated to obtain a solid catalyst component, except that the solid product slurry obtained in the same manner as in Example 6 (1) was used as the solid product slurry.

The solid catalyst component was found to contain 1.83 wt % of the titanium atom, 6.24 wt % of the phthalic acid ester, 0.03 wt % of the ethoxy group and 0.13 wt % of the butoxy group.

(2) Polymerization of Propylene

Example 1 (3) was repeated to polymerize propylene, except that the solid catalyst component obtained in the above (1) was used as the solid catalyst component. The results are as shown in Table 1.

TABLE 1

|  | Polymerization activity (g-PP/g-cat) | CXS (wt %) | [η] (dl/g) | Bulk density (g/ml) |
|---|---|---|---|---|
| Example 1 | 38,590 | 0.64 | 2.18 | 0.371 |
| Example 2 | 40,690 | 0.60 | 1.96 | 0.389 |
| Comparative Example 1 | 35,000 | 0.66 | 2.05 | 0.310 |
| Example 3 | 47,120 | 0.65 | 2.04 | 0.392 |
| Example 4 | 40,770 | 0.59 | 2.04 | 0.353 |
| Comparative Example 2 | 26,560 | 0.74 | 1.94 | 0.326 |
| Example 5 | 50,300 | 0.66 | 2.04 | 0.383 |
| Example 6 | 51,940 | 0.82 | 1.97 | 0.384 |
| Comparative Example 3 | 27,390 | 0.71 | 1.93 | 0.367 |
| Example 7 | 53,950 | 0.44 | 2.17 | 0.430 |
| Comparative Example 4 | 48,750 | 0.52 | 2.22 | 0.405 |
| Example 8 | 66,600 | 0.52 | 2.30 | 0.414 |
| Comparative Example 5 | 52,120 | 0.52 | 2.14 | 0.422 |
| Example 9 | 61,200 | 0.51 | 2.22 | 0.421 |
| Example 10 | 56,350 | 0.40 | 2.40 | 0.406 |

What is claimed is:

1. A process for producing a solid catalyst component (1) for α-olefin polymerization, which comprises the steps of:
   (1) reducing a titanium compound represented by the following formula [I] with an organomagnesium compound in the presence of an organosilicon compound having an Si—O bond, thereby obtaining a solid product, and
   (2) contacting the solid product with at least one member selected from the group consisting of an electron donor compound (E1) and an organic acid halide, and a compound having a Ti-halogen bond, thereby obtaining the solid catalyst component (1) for α-olefin polymerization,

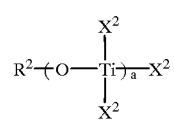

[I]

wherein "a" is a number of 2 to 20, $R^2$ is a hydrocarbon group having 1 to 20 carbon atoms, and $X^2$ is a halogen atom or a hydrocarbyloxy group having 1 to 20 carbon atoms, and all of $X^2$ may be the same or different from one another.

2. The process for producing a solid catalyst component (1) for α-olefin polymerization according to claim 1, wherein the step (2) comprises:
   (i) contacting the solid product with the electron donor compound (E1) to obtain a contacted product, and
   (ii) contacting the contacted product obtained with the compound having a Ti-halogen bond.

3. The process for producing a solid catalyst component (1) for α-olefin polymerization according to claim 1, wherein the step (2) comprises:
   (i) contacting the solid product with the compound having a Ti-halogen bond and the organic acid halide to obtain a contacted product, and
   (ii) contacting the contacted product obtained with the electron donor compound (E1) and the compound having a Ti-halogen bond.

4. The process for producing a solid catalyst component (1) f or α-olefin polymerization according to claim 1, wherein the electron donor compound (E1) contains an organic acid ester or an ether.

5. The process for producing a solid catalyst component (1) for α-olefin polymerization according to claim 1, wherein "a" in the formula [I] is 2 or 4.

6. A process for producing a solid catalyst component (2) for α-olefin polymerization, which comprises the steps of:
(1) reducing a titanium compound represented by the following formula [I] with an organomagnesium compound in the presence of an organosilicon compound having an Si—O bond and an ester compound, thereby obtaining a solid product, and
(2) contacting the solid product with at least one member selected from the group consisting of an electron donor compound (E1) and an organic acid halide, and a compound having a Ti-halogen bond, thereby obtaining the solid catalyst component (2) for α-olefin polymerization:

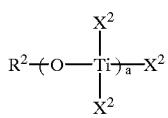
[I]

wherein "a" is a number of 2 to 20, $R^2$ is a hydrocarbon group having 1 to 20 carbon atoms, and $X^2$ is a halogen atom or a hydrocarbyloxy group having 1 to 20 carbon atoms, and all of $X^2$ may be the same or different from one another.

7. The process for producing a solid catalyst component (2) for α-olefin polymerization according to claim 6, wherein the step (2) comprises:
(i) contacting the solid product with the electron donor compound (E1) to obtain a contacted product, and
(ii) contacting the contacted product obtained with the compound having a Ti-halogen bond.

8. The process for producing a solid catalyst component (2) for α-olefin polymerization according to claim 6, wherein the step (2) coprises:
(i) contacting the solid product with the compound having a Ti-halogen bond and the organic acid halide to obtain a contacted product, and
(ii) contacting the contacted product obtained with the electron donor compound (E1) and the compound having a Ti-halogen bond.

9. The process for producing a solid catalyst component (2) for α-olefin polymerization according to claim 6, wherein the electron donor compound (E1) contains an organic acid ester or an ether.

10. The process for producing a solid catalyst component (2) for α-olefin polymerization according to claim 6, wherein "a" in the formula [I] is 2 or 4.

11. A process for producing a catalyst (1) for α-olefin polymerization, which comprises the steps of:
(1) reducing a titanium compound represented by the following formula [I] with an organomagnesium compound in the presence of an organosilicon compound having an Si—O bond, thereby obtaining a solid product,
(2) contacting the solid product with at least one member selected from the group consisting of an electron donor compound (E1) and an organic acid halide, and a compound having a Ti-halogen bond, thereby obtaining a solid catalyst component (1) for α-olefin polymerization, and
(3) contacting the solid catalyst component (1), an organoaluminum compound and an electron donor compound (E2) with one another, thereby obtaining the catalyst (1) for α-olefin polymerization:

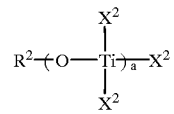
[I]

wherein "a" is a number of 2 to 20, $R^2$ is a hydrocarbon group having 1 to 20 carbon atoms, and $X^2$ is a halogen atom or a hydrocarbyloxy group having 1 to 20 carbon atoms, and all of $X^2$ may be the same or different from one another.

12. The process for producing a catalyst (1) for α-olefin polymerization according to claim 11, wherein the electron donor compound (E2) contains an alkoxysilicon compound represented by the following formula,

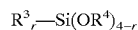

wherein $R^3$ is a hydrocarbon group having 1 to 20 carbon atoms or a hydrogen atom, $R^4$ is a hydrocarbon group having 1 to 20 carbon atoms, r is a number satisfying $0 \leq r < 4$, and all of $R^3$ and all of $R^4$ may be the same or different from one another, respectively.

13. A process for producing a catalyst (2) for α-olefin polymerization, which comprises the steps of:
(1) reducing a titanium compound represented by the following formula [I] with an organomagnesium compound in the presence of an organosilicon compound having an Si—O bond and an ester compound, thereby obtaining a solid product,
(2) contacting the solid product with at least one member selected from the group consisting of an electron donor compound (E1) and an organic acid halide, and a compound having a Ti-halogen bond, thereby obtaining a solid catalyst component (2) for α-olefin polymerization, and
(3) contacting the solid catalyst component (2), an organoaluminum compound and an electron donor compound (E2) with one another, thereby obtaining the catalyst (2) for α-olefin polymerization:

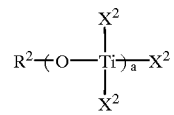
[I]

wherein "a" is a number of 2 to 20, $R^2$ is a hydrocarbon group having 1 to 20 carbon atoms, and $X^2$ is a halogen atom or a hydrocarbyloxy group having 1 to 20 carbon atoms, and all of $X^2$ may be the same or different from one another.

14. The process for producing a catalyst (2) for α-olefin polymerization according to claim 13, wherein the electron donor compound (E2) contains an alkoxysilicon compound represented by the following formula,

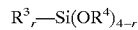

wherein $R^3$ is a hydrocarbon group having 1 to 20 carbon atoms or a hydrogen atom, $R^4$ is a hydrocarbon group having 1 to 20 carbon atoms, r is a number satisfying $0 \leq r < 4$, and all of $R^3$ and all of $R^4$ may be the same or different from one another, respectively.

15. A process for producing an α-olefin polymer, which comprises the steps of:
(1) reducing a titanium compound represented by the following formula [I] with an organomagnesium compound in the presence of an organosilicon compound having an Si—O bond compound, thereby obtaining a solid product, (2) contacting the solid product with at least one member selected from the group consisting of an electron donor compound (E1) and an organic acid halide, and a compound having a Ti-halogen bond, thereby obtaining a solid catalyst component (1) for α-olefin polymerization, (3) contacting the solid catalyst component (1), an organoaluminum compound and an electron donor compound (E2) with one another, thereby obtaining a catalyst (1) for α-olefin polymerization, and (4) subjecting an α-olefin to homopolymerization or copolymerization in the presence of the catalyst (1):

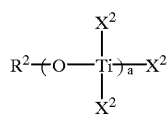

[I]

wherein "a" is a number of 2 to 20, $R^2$ is a hydrocarbon group having 1 to 20 carbon atoms, and $X^2$ is a halogen atom or a hydrocarbyloxy group and all of $X^2$ may be the same or different from one another.

16. A process for producing an α-olefin polymer, which comprises the steps of:

(1) reducing a titanium compound represented by the following formula [I] with an organomagnesium compound in the presence of an organosilicon compound having an Si—O bond and an ester compound, thereby obtaining a solid product, (2) contacting the solid product with at least one member selected from the group consisting of an electron donor compound (E1) and an organic acid halide, and a compound having a Ti-halogen bond, thereby obtaining a solid catalyst component (2) for α-olefin polymerization, (3) contacting the solid catalyst component (2), an organoaluminum compound and an electron donor compound (E2) with one another, thereby obtaining a catalyst (2) for α-olefin polymerization, and (4) subjecting an α-olefin to homopolymerization or copolymerization in the presence of the catalyst (2):

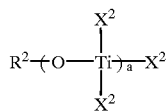

[I]

wherein "a" is a number of 2 to 20, $R^2$ is a hydrocarbon group having 1 to 20 carbon atoms, and $X^2$ is a halogen atom or a hydrocarbyloxy group and all of $X^2$ may be the same or different from one another.

* * * * *